(12) United States Patent
Liu

(10) Patent No.: US 9,913,494 B2
(45) Date of Patent: Mar. 13, 2018

(54) ELECTRONIC CIGARETTE

(71) Applicant: HUIZHOU KIMREE TECHNOLOGY CO., LTD, Huizhou, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 283 days.

(21) Appl. No.: 14/719,714

(22) Filed: May 22, 2015

(65) Prior Publication Data

US 2015/0366267 A1    Dec. 24, 2015

Related U.S. Application Data

(63) Continuation of application No. PCT/CN2014/080491, filed on Jun. 23, 2014.

(51) Int. Cl.
*A24F 47/00* (2006.01)
*H01M 2/10* (2006.01)

(52) U.S. Cl.
CPC ......... *A24F 47/008* (2013.01); *H01M 2/1055* (2013.01)

(58) Field of Classification Search
USPC .................................. 439/38–39, 700, 824
See application file for complete search history.

(56) References Cited

U.S. PATENT DOCUMENTS

| 4,735,217 A | 4/1988 | Gerth et al. |
| 2011/0278189 A1* | 11/2011 | Terry ............... A24F 47/008 206/459.1 |
| 2012/0174914 A1 | 7/2012 | Pirshafiey et al. |
| 2012/0199663 A1* | 8/2012 | Qiu ............... A61M 11/041 239/8 |

(Continued)

FOREIGN PATENT DOCUMENTS

| CN | 201375023 Y | 1/2010 |
| CN | 201718468 U | 1/2011 |

(Continued)

OTHER PUBLICATIONS

International Search Report corresponding to Application No. PCT/CN2014/080491; dated Mar. 23, 2015.

*Primary Examiner* — Jason L Lazorcik
*Assistant Examiner* — Baileigh K Darnell
(74) *Attorney, Agent, or Firm* — U.S. Fairsky LLP; Yue Xu

(57) ABSTRACT

An electronic cigarette is provided, which can prevent users being short of breath and a short circuit of a battery assembly. When the atomizer assembly is connected to the battery assembly, the first elastic electrode column and the second elastic electrode column abut against the annular end surface of the outer electrode and the annular end surface of the inner electrode, respectively, and the first elastic electrode column and the second elastic electrode column are both deviated from the opening of the hollow cavity of the inner electrode of the atomizer assembly. Thus, a manner of point-surface contact and deviating from the opening of the cavity is formed, which not only ensures an unobstructed air passage and prevents users being short of breath.

13 Claims, 8 Drawing Sheets

(56) References Cited

U.S. PATENT DOCUMENTS

| | | | |
|---|---|---|---|
| 2013/0192618 A1* | 8/2013 | Li | A24F 47/008 131/329 |
| 2014/0014126 A1 | 1/2014 | Peleg et al. | |
| 2014/0130797 A1* | 5/2014 | Liu | A24F 47/008 128/202.21 |
| 2014/0130816 A1* | 5/2014 | Liu | A24F 47/008 131/329 |
| 2014/0332019 A1* | 11/2014 | Liu | A61M 15/06 131/329 |
| 2014/0332022 A1* | 11/2014 | Li | A24F 47/008 131/329 |
| 2014/0360516 A1* | 12/2014 | Liu | A24F 47/008 131/329 |
| 2014/0366895 A1* | 12/2014 | Li | H01M 2/1055 131/329 |
| 2015/0118895 A1* | 4/2015 | Zheng | H01R 13/66 439/529 |
| 2015/0150307 A1* | 6/2015 | Liu | H05B 1/0244 131/329 |
| 2015/0164142 A1* | 6/2015 | Li | F22B 1/288 131/329 |

FOREIGN PATENT DOCUMENTS

| | | | |
|---|---|---|---|
| CN | 102160906 A | | 8/2011 |
| CN | 202566289 U | * | 12/2012 |
| CN | 202855973 U | | 4/2013 |
| CN | 203040680 U | | 7/2013 |
| CN | 203103593 U | | 7/2013 |
| CN | 203302351 U | | 11/2013 |
| CN | 203339363 U | | 12/2013 |
| CN | 203369386 U | | 1/2014 |
| CN | 103687503 A | | 3/2014 |
| CN | 203482897 U | | 3/2014 |
| CN | 203505592 U | | 4/2014 |
| CN | 203538388 U | | 4/2014 |
| CN | 203555167 U | | 4/2014 |
| CN | 203597403 U | | 5/2014 |

* cited by examiner

ELECTRONIC CIGARETTE

CROSS REFERENCE TO RELATED APPLICATIONS

This application is a continuation under 35 U.S.C. § 120 of PCT/CN2014/080491, filed on Jun. 23, 2014, the entire disclosure of which is incorporated herein by reference.

TECHNICAL FIELD

The present application relates to the technical field of electronic cigarettes, and particularly to an electronic cigarette which prevents users being short of breath and a short circuit of a battery assembly.

BACKGROUND

The structure of a conventional electronic cigarette is shown in FIG. 1. The conventional electronic cigarette includes an atomizer 110 and a battery assembly 120 which are connected to each other. The electrodes of the battery assembly 120 are coaxial with the electrodes of the atomizer 110. The electrodes of the battery assembly 120 include a lower electrode copper part 121 and an internally threaded copper part 122, which are connected to a positive electrode and a negative electrode of a battery, respectively. The electrodes of the atomizer 110 include an upper electrode 111 and an externally threaded electrode 112. The upper electrode 111 and the externally threaded electrode 112 are electrically connected to an electrical heating wire 113 of the atomizer 110. When the atomizer 110 is connected to the battery assembly 120, the lower electrode copper part 121 of the battery assembly 120 is electrically connected to the upper electrode 111 of the atomizer 110, and the internally threaded copper part 122 of the battery assembly 120 is electrically connected to the externally threaded electrode 112 of the atomizer 110, thus, a closed loop is formed, and the battery assembly 120 can provide power to the electric heating wire 113 of the atomizer 110 to generate smoke.

Contacting portions of the lower electrode copper part 121 and the upper electrode 111 are in an annular surface contact, as well as contacting portions of the externally threaded electrode 112 and the internally threaded copper part 122. The upper electrode of the atomizer 110 is of a hollow structure. When a user smokes the electronic cigarette, the airflow passes through a cavity. The lower electrode copper part 121 of the battery assembly 120 is of a hollow structure. When the atomizer 110 is connected to the battery assembly 120, the position of the cavity of the upper electrode 111 is corresponding to the position of the cavity of the lower electrode copper part 121, and the cavity of the upper electrode 111 is in communication with the cavity of the lower electrode copper part 121, thereby forming an airflow passage of the electronic cigarette. When the electronic cigarette is used for a long time, the cigarette liquid in the atomizer 110 is prone to flow from the cavity of the upper electrode 111 into the battery assembly 120 through the cavity of the lower electrode copper part 121 due to the gravity or capillary action, which may cause a short circuit of the battery assembly 120, and further reduces the service life of the electronic cigarette. Further, in order to increase the air quantity and decrease the heat generated by the atomizer 110 in operation, the externally threaded electrode 112 of the atomizer 110 is provided with an inlet hole 114, and the end surface of the upper electrode is provided with a vent groove 115 transversely which is in communication with the cavity and the inlet hole 114. However, when the atomizer 110 is connected to the battery assembly 120, the end surface of the upper electrode 111 abuts against the end surface of the lower electrode copper part 121. Thus, the vent groove 115 is prone to be blocked by dirt formed by the leaked cigarette liquid contaminated by dust, which blocks the airflow passage, and further causes users being short of breath when smoking the electronic cigarette.

SUMMARY

In view of the above technical problems, an electronic cigarette is provided according to the present application, which can prevent users being short of breath and a short circuit of a battery assembly.

An electronic cigarette includes an atomizer assembly and a battery assembly, wherein the atomizer assembly includes an outer electrode, an inner electrode, and an electric heating wire assembly, and the outer electrode and the inner electrode are electrically connected to the electric heating wire assembly, respectively; the inner electrode is provided with a hollow cavity configured to allow smoke to pass through, a middle of the outer electrode is provided with a through hole for insertion of the inner electrode, and each of end surfaces, facing the battery assembly, of the outer electrode and the inner electrode is an annular end surface;

the battery assembly includes a first elastic electrode column, a second elastic electrode column, and a battery; the first elastic electrode column and the second elastic electrode column are arranged in parallel to each other and are electrically connected to a positive electrode and a negative electrode of the battery, respectively;

the atomizer assembly is configured to be detachably connected to the battery assembly, and in the case that the atomizer assembly is connected to the battery assembly, the first elastic electrode column and the second elastic electrode column abut against the annular end surface of the outer electrode and the annular end surface of the inner electrode, respectively; the first elastic electrode column and the second elastic electrode column are both deviated from an opening of the hollow cavity; and the outer electrode and the first elastic electrode column together with the inner electrode and the second elastic electrode column are configured to form a closed loop, to allow the battery to provide power to the electric heating wire assembly.

Preferably, the battery assembly further includes a battery sleeve configured to wrap and protect elements inside the battery assembly;

the battery sleeve is provided with an end cap at an end where the battery assembly and the atomizer assembly are connected; and the end cap is provided with through holes for insertion of the first elastic electrode column and the second elastic electrode column, and further provided with a smoke through hole configured to allow the smoke to pass through.

Preferably, the battery assembly is further provided with a smoke channel configured to allow the smoke to pass through, and the smoke channel is isolated from the elements inside the battery assembly; and the smoke channel is in communication with the smoke through hole.

Preferably, each of the first elastic electrode column and the second elastic electrode column includes a fixing sleeve, a spring, and a conductive terminal;

the fixing sleeve is fixed on the end cap;

the conductive terminal has one end movably inserted in the fixing sleeve, and another end extending out of the fixing sleeve and abutting against the annular end surface of the outer electrode or the inner electrode; and the spring is provided inside the fixing sleeve and elastically abuts against the fixing sleeve and one end of the conductive terminal.

Preferably, the annular end surface of the outer electrode and the annular end surface of the inner electrode are each provided with a groove; and the grooves are configured to allow the first elastic electrode column and the second elastic electrode to be slidable along the annular end surfaces, respectively, and to allow the outer electrode to be in contact with and electrically connected to the first elastic electrode column and the inner electrode to be in contact with and electrically connected to the second elastic electrode column.

Preferably, the battery assembly is further provided with a connecting part;

a first end of the connecting part is threadedly connected to the battery sleeve; and;

a second end of the connecting part is provided with threads and is configured to threadedly connect the battery assembly to the atomizer assembly.

Preferably, the electronic cigarette further includes a liquid container for storing the cigarette liquid and a suction end for smoking the electronic cigarette;

the liquid container is configured to be detachably connected to the atomizer assembly, and one end of the atomizer assembly is configured to be inserted into the liquid container to lead out the cigarette liquid in the liquid container to be atomized; and the suction end is arranged at an end of the electronic cigarette away from the liquid container.

Preferably, the atomizer assembly further includes an atomizing core for atomizing the cigarette liquid, and at least one end of the atomizing core is inserted in the liquid container;

the atomizing core includes a sleeve, and a cigarette liquid locking part made of a liquid-absorbing material;

the cigarette liquid locking part is arranged inside the sleeve and fits closely to an inner circumferential surface of the sleeve, and is configured to deliver the cigarette liquid in the liquid container to the electric heating wire assembly to be atomized, and to prevent leakage of the cigarette liquid in the case that the liquid container is placed upside down; and the sleeve is configured to wrap the cigarette liquid locking part for protection.

Preferably, the electronic cigarette further includes an elastic sealing sleeve sleeved on an outer circumferential surface of the sleeve; and one end of the elastic sealing sleeve abuts against an opening of the liquid container, to prevent leakage of the cigarette liquid from the opening.

Preferably, the liquid container and the battery assembly are located at two ends of the atomizer assembly, respectively, and the liquid container, the battery assembly and the atomizer assembly are arranged coaxially with each other; and the suction end is arranged at one end of the battery assembly away from the atomizer assembly.

Preferably, an end, facing the atomizer assembly, of the battery assembly is provided with a smoke through hole which is in communication with the suction end and is configured to allow the smoke to pass through, and the smoke through hole and the opening of the hollow cavity of the inner electrode are staggered with each other.

Preferably, the electric heating wire includes a liquid-guiding part extending along an axial direction of the sleeve, and an electric heating wire winding around the liquid-guiding part and electrically connected to the outer electrode and the inner electrode; and the cigarette liquid locking part and the liquid-guiding part are each of a solid cylindrical shape, and a sectional area of the cigarette liquid locking part is larger than a sectional area of the liquid-guiding part.

Preferably, an insulating ring is provided between the outer electrode and the inner electrode, to insulate and separate the outer electrode from the inner electrode.

Based on the above technical solutions, the present application has the following advantages.

When the atomizer assembly is connected to the battery assembly, the first elastic electrode column and the second elastic electrode column abut against the annular end surface of the outer electrode and the annular end surface of the inner electrode, respectively, and the first elastic electrode column and the second elastic electrode column are both deviated from the opening of the hollow cavity of the inner electrode of the atomizer assembly. Thus, a manner of point-surface contact and deviating from the opening of the cavity is formed, which not only ensures an unobstructed air passage and prevents users being short of breath, and even when the cigarette liquid flows from the opening of the hollow cavity toward the battery assembly due to the gravity or capillarity action, the cigarette liquid is not prone to flow into the battery assembly, which solves the problem in the conventional technology that the cigarette liquid is prone to directly flow into the battery assembly, to cause a short circuit of the battery assembly, and further reduce the service life of the electronic cigarette. In addition, with the structure of the elastic electrode columns elastically abutting against the annular end surfaces, the elastic electrode columns can always elastically abut against the annular end surfaces, regardless whether the battery assembly and the atomizer assembly are connected in place, thereby improving the reliability of the electrical connection between the battery assembly and the atomizer assembly and significantly improving the user experience.

BRIEF DESCRIPTION OF THE DRAWINGS

For more clearly illustrating embodiments of the present application or the technical solution in the conventional technology, drawings referred to describe the embodiments or the conventional technology will be briefly described hereinafter. Apparently, the drawings in the following description are only several embodiments of the present application, and for the person skilled in the art other drawings may be obtained based on these drawings without any creative efforts.

DETAILED DESCRIPTION

Figure 1:
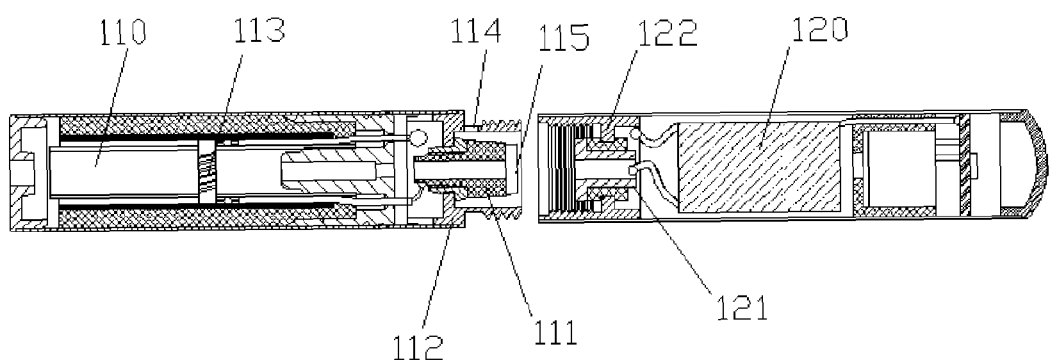
FIG. 1 is a sectional view showing an overall structure of a conventional electronic cigarette.
Figure 2:
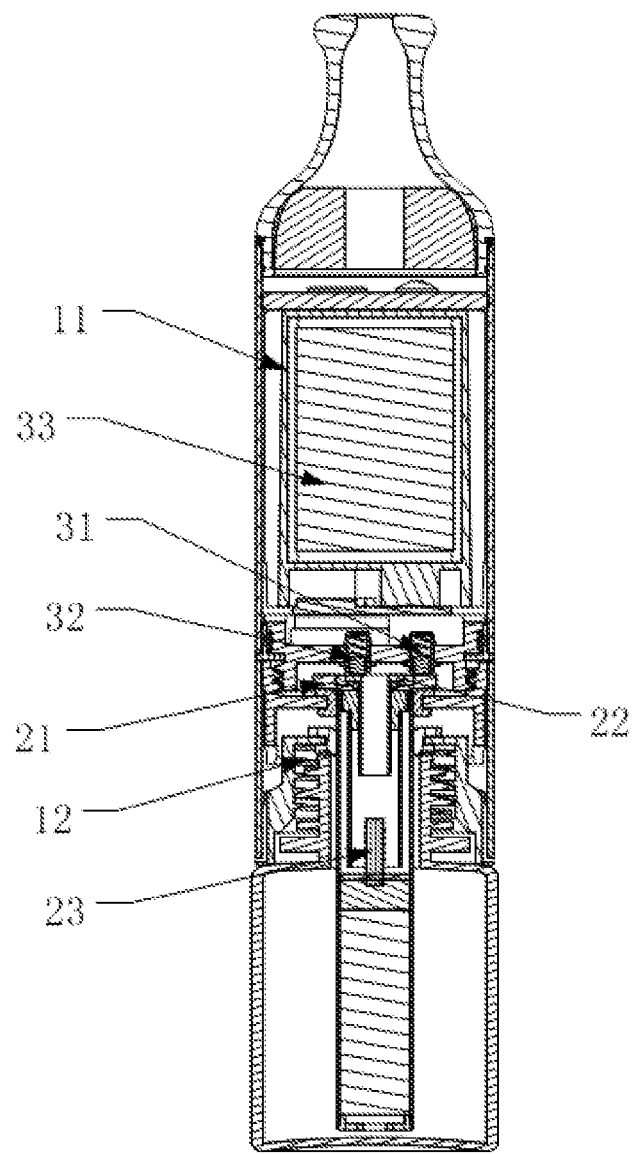
FIG. 2 is a sectional view showing an overall structure of an electronic cigarette according to the present application.

An electronic cigarette is provided according to the present application, which may prevent users being short of breath and a short circuit of a battery assembly. Reference is made to FIG. 2. The electronic cigarette includes an atomizer assembly 12 and a battery assembly 11. The atomizer assembly 12 includes an outer electrode 21, an inner electrode 22, and an electric heating wire assembly 23. The outer electrode 21 and the inner electrode 22 are electrically connected to the electric heating wire assembly 23. The inner electrode 22 is provided with a hollow cavity which allows smoke to pass through. The middle of the outer electrode 21 is provided with a through hole for insertion of the inner electrode 22. The end surfaces, facing the battery assembly 11, of the outer electrode 21 and the inner electrode 22 are annular end surfaces.

The battery assembly 11 includes a first elastic electrode column 31, a second elastic electrode column 32 and a battery 33. The first elastic electrode column 31 and the second elastic electrode column 32 are arranged in parallel with each other and are electrically connected to a positive electrode and a negative electrode of the battery 33, respectively.

The atomizer assembly 12 is detachably connected to the battery assembly 11, and when the atomizer assembly 12 is connected to the battery assembly 11, the first elastic electrode column 31 and the second elastic electrode column 32 abut against the annular end surface of the outer electrode 21 and the annular end surface of the inner electrode 22, respectively. The first elastic electrode column 31 and the second elastic electrode column 32 are both deviated from an opening of the hollow cavity. The outer electrode 21 and the first elastic electrode column 31 are electrically connected, and the inner electrode 22 and the second elastic electrode column 32 are electrically connected, to form a closed loop, which allows the battery 33 to provide powder to the electric heating wire assembly 23.

Thus, when the atomizer assembly 12 is connected to the battery assembly 11, the first elastic electrode column 31 and the second elastic electrode column 32 abut against the annular end surface of the outer electrode 21 and the annular end surface of the inner electrode 22, respectively, and the first elastic electrode column 31 and the second elastic electrode column 32 are both deviated from the opening of the hollow cavity of the inner electrode of the atomizer assembly 12. Thus, a manner of point-surface contact and deviating from the opening of the cavity is formed, which not only ensures an unobstructed air passage and prevents users being short of breath, and even when the cigarette liquid flows from the opening of the hollow cavity toward the battery assembly 11 due to the gravity or capillarity action, the cigarette liquid is not prone to flow into the battery assembly 11, which solves the problem in the conventional technology that the cigarette liquid is prone to directly flow into the battery assembly 11, to cause a short circuit of the battery assembly, and further reduce the service life of the electronic cigarette. In addition, with the structure of the elastic electrode columns elastically abutting against the annular end surfaces, the elastic electrode columns can always elastically abut against the annular end surfaces, regardless whether the battery assembly and the atomizer assembly are connected in place, that is whether the insertion depth is enough, thereby improving the reliability of the electrical connection between the battery assembly 11 and the atomizer assembly 12 and significantly improving the user experience.

In order to make the purposes, features, and advantage of the present application more apparent and easy to understand, the technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 3:
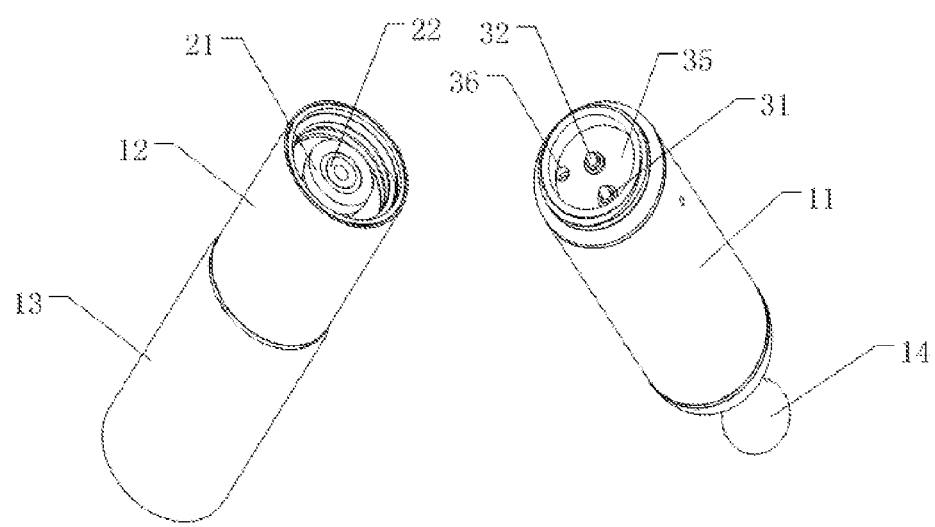
FIG. 3 is a structural view of connecting portions of an atomizer assembly and a battery assembly of the electronic cigarette according to the present application.
Figure 4:
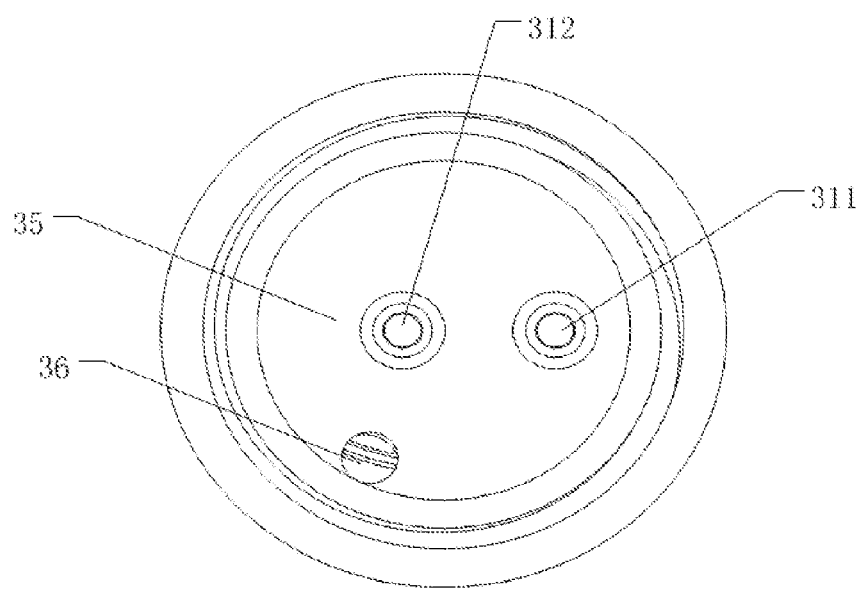
FIG. 4 is a structural view of an end cap of the electronic cigarette according to the present application.
Figure 6:
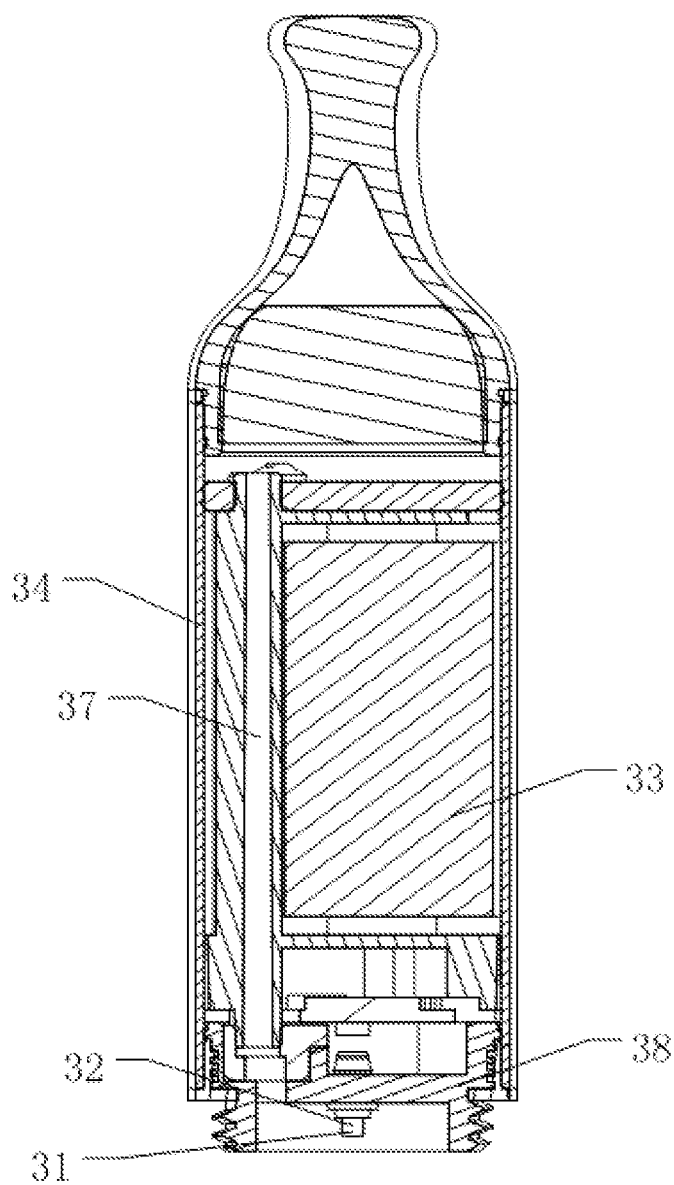
FIG. 6 is a sectional view of another embodiment of the battery assembly of the electronic cigarette according to the present application.
Figure 8:
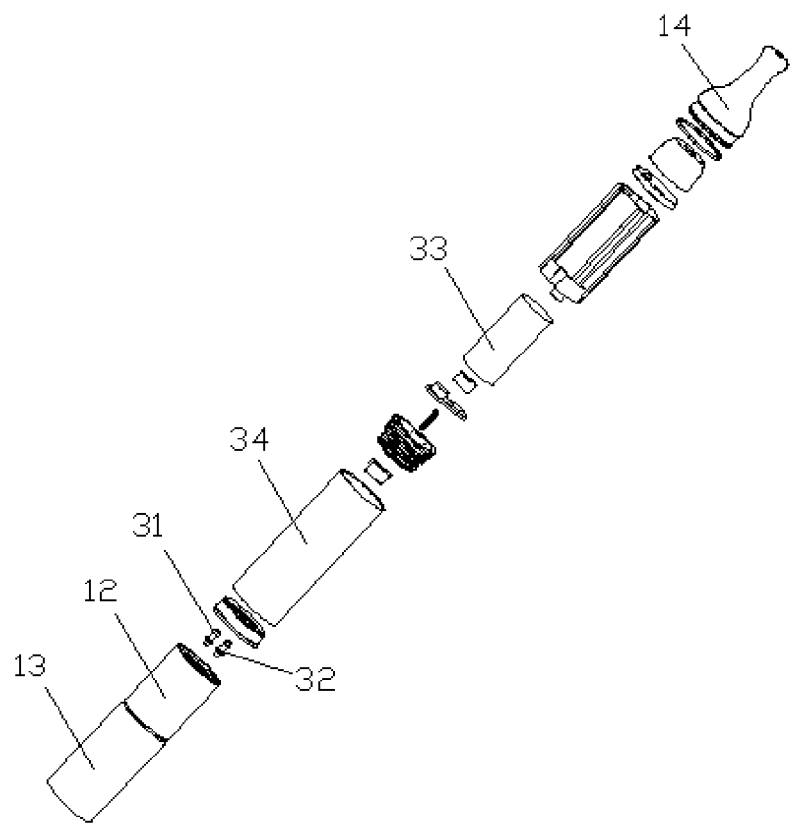
FIG. 8 is an exploded view showing the overall structure of the another embodiment of the electronic cigarette according to the present application.

In this embodiment, referring to FIG. 6 and FIG. 8, the battery assembly 11 further includes a battery sleeve 34 configured to wrap the elements inside the battery assembly 11. Referring to FIG. 3 and FIG. 4, the battery sleeve 34 is provided with an end cap 35 at one end where the battery assembly 11 and the atomizer assembly 12 are connected. One end of the battery assembly 11 facing the atomizer assembly 12 is provided with a smoke through hole 36 allowing smoke to pass through, and the smoke through hole 36 and the opening of the hollow cavity of the inner electrode 22 are staggered with each other. The end cap 35 is provided with through holes allowing the first elastic electrode column 31 and the second elastic electrode column 32 to pass through, and is further provided with the smoke through hole 36 allowing the smoke to pass through.

In this embodiment, the end cap 35 is provided on the battery assembly 11 at the end where the battery assembly 11 is connected to the atomizer assembly 12, and the end cap 35 is provided with the smoke through hole 36. When the atomizer assembly 12 is connected to the battery assembly 11, the end cap 35 forces the smoke to only flow through the smoke through hole 36, and other parts of the end cap 35 are sealed. A through hole 311 of the first elastic electrode column and a through hole 312 of the second electrode column on the end cap 35 are each of a sealing structure, thus the smoke cannot pass through the through hole 311 and the through hole 312. Thus, the through hole 311 and the through hole 312 are arranged on the end cap 35, which allows the first elastic electrode column 31 and the second elastic electrode column 32 to be in conductively contact with the outer electrode 21 and the inner electrode 22, and also allows the smoke to pass through the smoke through hole 36. Certainly, the through hole 311, the through hole 312 and the smoke through hole 36 on the end cap 35 are not limited to be arranged at the position shown in FIG. 3 and FIG. 4, which may be arranged according to the actual condition, and the specific positions thereof are not limited here. In addition, since the smoke through hole 36 and the opening of the hollow cavity of the inner electrode 22 are staggered with each other, even when the cigarette liquid flows from the opening of the hollow cavity toward the battery assembly 11 due to the gravity or capillarity action, the cigarette liquid is not prone to flow into the battery assembly 11.

In this embodiment, the battery assembly 11 is further provided with a smoke channel 37 allowing the smoke to flow through, and the smoke channel 37 is isolated from the elements inside the battery assembly. The smoke channel 37 is in communication with the smoke through hole 36.

Thus, the smoke channel 37 is specifically provided inside the battery assembly 11 and is in communication with the smoke through hole 36, in this way, when the smoke flows inside the battery assembly 11, the smoke may flow along the smoke channel 37, thus the smoke is prevented from flowing through the battery assembly 11 to further cause the battery 33 being shorted and damaged.

Figure 5:
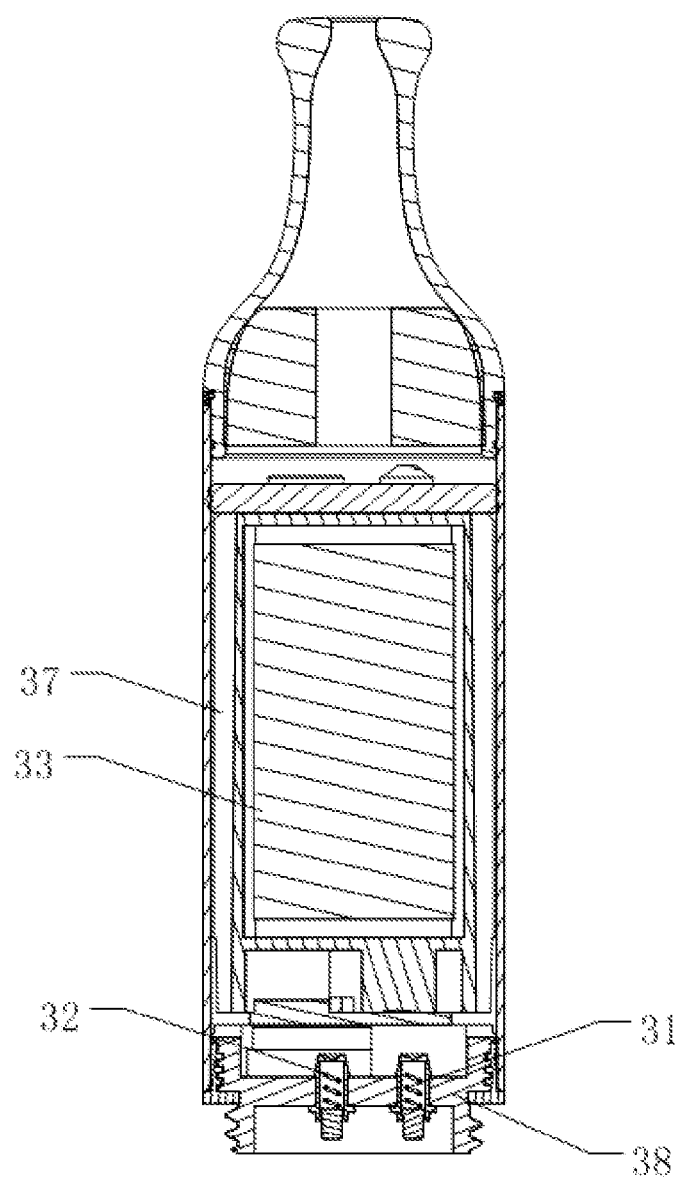
FIG. 5 is a sectional view of an embodiment of the battery assembly of the electronic cigarette according to the present application.

In this embodiment, referring to FIG. 5, the smoke channel 37 is arranged at a side portion of the battery 33 and close to the battery sleeve 34. Certainly, the smoke channel 37 may also be arranged at a position as shown in FIG. 6. The axis of the battery 33 and the axis of the battery assembly 11 are not collinear, and the smoke channel 37 is arranged at a side of the battery assembly 11, and specifically, a space, at a side of the battery where the battery sleeve is arranged, is saved for the smoke channel 37. Thus, the machining process of the electronic cigarette is simplified, and the working efficiency is improved. This manner will not affect the usage of the electronic cigarette. The positions of the battery 33 and the smoke channel 37 are not limited here.

Figure 10:
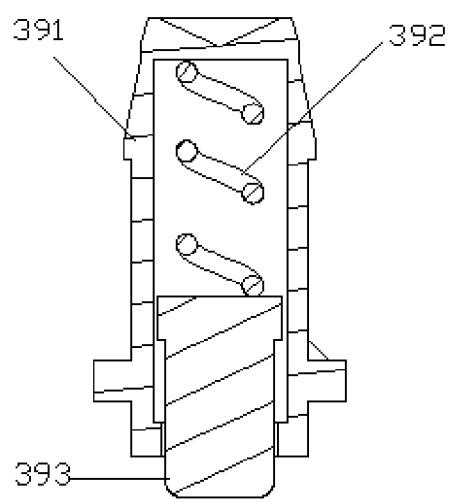
FIG. 10 is a sectional view showing the overall structure of a first elastic electrode column of the electronic cigarette according to the present application.

Reference is made to FIG. 10. Each of the first elastic electrode column 31 and the second elastic electrode column 32 is embodied as an elastic electrode column. Each of the first elastic electrode column 31 and the second elastic electrode column 32 includes a fixing sleeve 391, a spring 392, and a conductive terminal 393. The fixing sleeve 391 is fixed on the end cap 35. One end of the conductive terminal 393 is movably inserted into the fixing sleeve 391, and another end of the conductive terminal 393 extends out of the fixing sleeve 391 and abuts against the annular end surface of the outer electrode 21 or the inner electrode 22. The spring 392 is provided inside the fixing sleeve 391 and elastically abuts against the fixing sleeve 391 and one end of the conductive terminal 393. When the battery assembly 11 is connected to the atomizer assembly 12, the springs 392 of the first elastics electrode column 31 and the second elastics electrode column 32 are compressed, and due to the reacting forces of the springs, the conductive terminals 393 are in contact with the outer electrode 21 and the inner electrode 22 of the atomizer assembly 12 more tightly, which ensures the electrical connection between the battery assembly 11 and atomizer assembly 12. It can be appreciated that, the first elastic electrode column 31 and the second elastic electrode column 32 may be made of conductive rubber or other materials, which is not limited here.

In this embodiment, in order to ensure the electrical connection between the battery assembly 11 and the atomizer assembly 12, the annular end surface of the outer electrode 21 and the annular end surface of the inner electrode 22 are each provided with a groove.

The grooves are configured to allow the first elastic electrode column 31 and the second elastic electrode column 32 to slide along the annular end surfaces, to allow the outer electrode 21 to be in contact with and electrically connected to the first elastic electrode column 31 and the inner electrode 22 to be in contact with and electrically connected to the second elastic electrode column 32.

Specifically, when the battery assembly 11 is electrically connected to the atomizer assembly 12, the first elastic electrode column 31 and the second elastic electrode column 32 are snapped into the grooves on the annular end surfaces of the outer electrode 21 and the inner electrode 22, respectively. Thus, it ensures the position of the electrical connection between the outer electrode 21 and the first elastic electrode column 31 and the position of the electrical connection between the inner electrode 22 and the second elastic electrode column 32, and further ensures a well connection between the battery assembly 11 and the atomizer assembly 12. Further, in the case that the battery assembly 11 is connected to the atomizer assembly 12 by threads, the first elastic electrode column 31 and the second elastic electrode column 32 are rotatable in the grooves on the annular end surfaces of the outer electrode 21 and the inner electrode 22, respectively. In the case that the battery assembly 11 is connected to the atomizer assembly 12 by snap fit or other manners, the first elastic electrode column 31 and the second elastic electrode column 32 are directly snapped into the grooves on the annular end surfaces of the outer electrode 21 and the inner electrode 22, respectively, without affecting the connection manner between the battery assembly 11 and the atomizer assembly 12.

In this embodiment, referring to FIG. 5 and FIG. 6, the battery assembly 11 is further provided with a connecting part 38. The connecting part 38 has a first end threadedly connected to the battery sleeve 34, and a second end provided with threads configured to threadedly connect the battery assembly 11 to the atomizer assembly 12.

Thus, the threaded connection between the battery assembly 11 and the atomizer assembly 12 is realized by connecting the connecting part 38 to the battery sleeve 34 and then threadedly connecting the connecting part 38 to the atomizer assembly 12.

Figure 7:
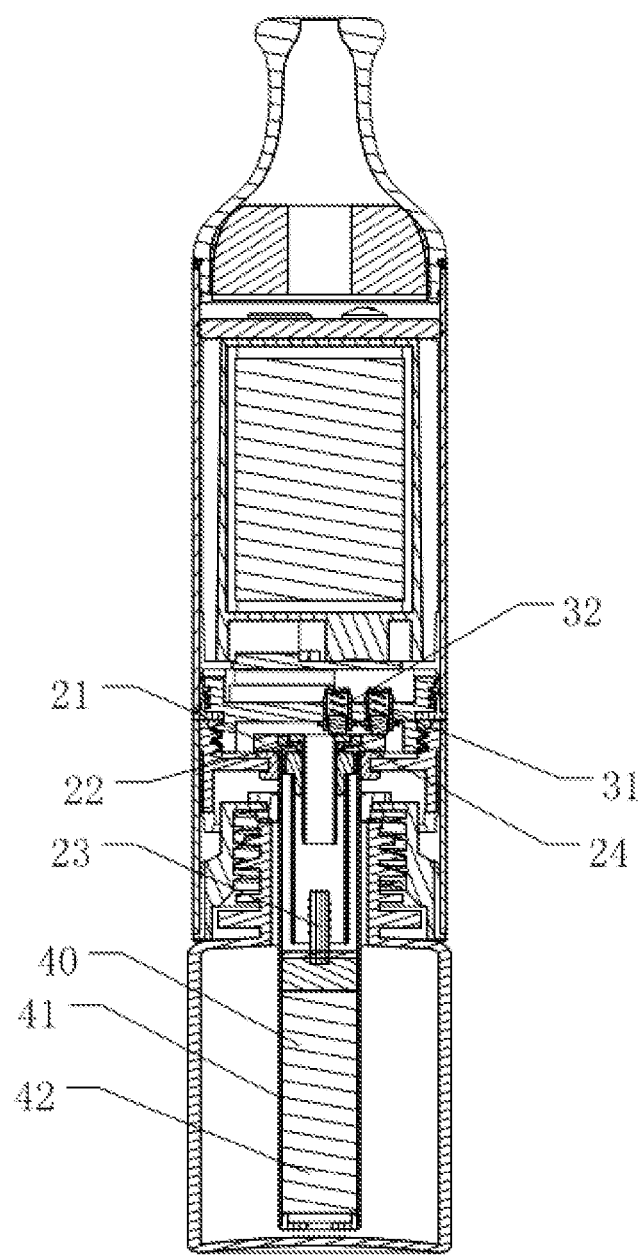
FIG. 7 is a sectional view showing an overall structure of another embodiment of the electronic cigarette according to the present application.
Figure 9:
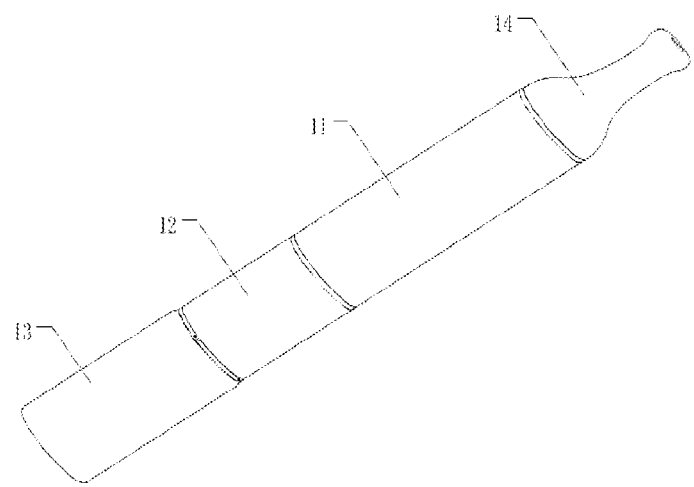
FIG. 9 is a schematic view of the overall structure of the another embodiment of the electronic cigarette according to the present application.

In this embodiment, referring to FIG. 7 and FIG. 9, the electronic cigarette further includes a liquid container 13 for storing cigarette liquid. The liquid container 13 is detachably connected to the atomizer assembly 12. In the case that the liquid container 13 needs to be replaced or to refill the cigarette liquid when the cigarette liquid in the liquid container 13 is used up, the liquid container 13 can be detached from the atomizer assembly, thus it is convenient to replace the liquid container 13 or fill the cigarette liquid.

In this embodiment, referring to FIG. 7, one end of the atomizer assembly 12 is inserted into the liquid container 13 for leading out the cigarette liquid in the liquid container 13 to be atomized. The atomizer assembly 12 further includes an atomizing core 40 for atomizing the cigarette liquid, and at least one end of the atomizing core is inserted in the liquid container 13. The atomizing core 40 includes a sleeve 41 and a cigarette liquid locking part 42 made of a liquid-absorbing material. The cigarette liquid locking part 42 is provided inside the sleeve 41 and fits closely to the inner circumferential surface of the sleeve 41, and is configured to deliver the cigarette liquid in the liquid container 13 to the electric heating wire assembly 23 to be atomized, and to prevent the leakage of the cigarette liquid when the liquid container 13 is placed upside down. The sleeve 41 is provided for wrapping and protecting the cigarette liquid locking part 42. In addition, an elastic sealing sleeve (without being marked) is provided at the outer circumferential surface of the sleeve 41, and one end of the elastic sealing sleeve abuts against the opening of the liquid container 13 to prevent the cigarette liquid from leaking through the opening. In this embodiment, the elastic sealing sleeve is clampingly fixed in one end of the atomizer assembly 12.

In this embodiment, the cigarette liquid locking part 42 can also better prevent the cigarette liquid from being overly delivered to the electric heating wire assembly 23, which ensures the stability of the smoke quantity. The sleeve 41 is provided for wrapping the cigarette liquid locking part 42 for protection. The sleeve 41 is further provided with a liquid-guiding hole which may guide the cigarette liquid in the liquid container 13 into the atomizing core 40 quickly, thereby preventing dry-heating of the atomizer due to lack of liquid and generating toxic gas, and further preventing the atomizer from being damaged.

The electric heating wire assembly 23 includes a liquid-guiding part (without being marked) extending in the axial direction of the sleeve 41, and an electric heating wire winding around the liquid-guiding part and electrically connected to the outer electrode 21 and the inner electrode 22, that is, the liquid-guiding part is arranged coaxial with the cigarette liquid locking part 42. The liquid-guiding part may be embodied as glass fiber line or cotton line, and other structures, as long as it can guide the liquid, which is not limited here.

The cigarette liquid locking part 42 and the liquid-guiding part are each of a solid cylindrical structure. The axis of the cigarette liquid locking part 42 coincides with or is in parallel with the axis of the liquid-guiding part, and the sectional area of the cigarette liquid locking part 42 is larger than the sectional area of the liquid-guiding part.

The cigarette liquid locking part 42 and the liquid-guiding part are each of a solid cylindrical structure and are arranged coaxially with each other, and the sectional area of the axis of the cigarette liquid locking part 42 is larger than the sectional area of the liquid-guiding part, thus the path for delivering the cigarette liquid is in a stepped structure. With such structure, the oil absorption state of the cigarette liquid locking part 42 is substantially in a saturated condition, and the oil absorption state of the liquid-guiding part is in an appropriate condition, thereby ensuring that the liquid-guiding part can obtain the required cigarette liquid from the cigarette liquid locking part 42 at any time. Thus, the amount of the smoke can be further improved and the dry-heating of the electric heating wire assembly 23, and also the cigarette liquid in the liquid container 2 can be prevented from leaking, thereby ensuring the atomizer 3 to generate the smoke stably. In this embodiment, the axis of the cigarette liquid locking part 42 coincides with the axis of the liquid-guiding part. Certainly, the axis of the cigarette liquid locking part 42 may also be arranged parallel to or at an angle to the axis of the liquid-guiding part, which is not limited here.

In this embodiment, referring to FIG. 9, the electronic cigarette further includes a suction end 14 for sucking the electronic cigarette. The suction end 14 is arranged at one end of the electronic cigarette away from the liquid container 13. Thus, when a user smokes the electronic cigarette, the smoke will not pass through the liquid container 13, which prevents the cigarette liquid from being carried into the mouth and further affecting the smoking effect. In this embodiment, the liquid container 13 and the battery assembly 11 are arranged at two ends of the atomizer assembly 12, respectively, and the liquid container 13, the battery assembly 11 and the atomizer assembly 12 are arranged coaxially with each other. The suction end 14 is arranged at the end of the battery assembly 11 away from the atomizer assembly 12.

Since the liquid container 13 is arranged at the end of the electronic cigarette away from the suction end 14, the liquid container 13 for storing the cigarette liquid is away from the suction end 14, and when the user smokes the electronic cigarette, it can avoid the user sucking in the cigarette liquid which may affect the experience effect.

The battery assembly 11 is arranged between the liquid container 13 and the suction end 14, and the atomizer assembly 12 is arranged between the battery assembly 11 and the liquid container 13, thus the atomizer assembly 12 is away from the suction end 14. In this way, when the user smokes the electronic cigarette, the atomizer assembly 12 is away from the mouth of the user, and the user will not be scalded by the heat generated by the atomizer assembly 12 when atomizing the cigarette liquid, thereby effectively improving the usage safety of the electronic cigarette. Further, when using the electronic cigarette, the user does not need to hold the heating atomizer assembly 12, thus when the user smokes the electronic cigarette, his hand will not be scalded, and the electronic cigarette effectively imitates the temperature of a real cigarette, thereby effectively improving the user experience during the smoking. In addition, with such structure, the atomizer assembly 12 is generally located below the battery assembly 11 when the user smokes the electronic cigarette, which may better avoid the cigarette liquid in the atomizer assembly 12 from flowing into the battery assembly 11, and avoid the battery assembly 11 from being shorted.

In this embodiment, an insulating ring 24 is provided between the outer electrode 21 and the inner electrode 22, to isolate and separate the outer electrode 21 from the inner electrode 22. The sealing ring 24 may be made of insulated rubber or silica gel, and etc.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein. For example, the electronic cigarette may only include the battery assembly 11 and the atomizer assembly 12, and one end of the atomizer assembly 12 is used as the suction end, and these solutions all fall in the scope of the present application.

The invention claimed is:

1. An electronic cigarette, comprising an atomizer assembly and a battery assembly, wherein the atomizer assembly comprises an outer electrode, an inner electrode, and an electric heating wire assembly, and the outer electrode and the inner electrode are electrically connected to the electric heating wire assembly, respectively; the inner electrode is provided with a hollow cavity configured to allow smoke to pass through, a middle of the outer electrode is provided with a through hole for insertion of the inner electrode, and each of end surfaces, facing the battery assembly, of the outer electrode and the inner electrode is an annular end surface;

the battery assembly comprises a first elastic electrode column, a second elastic electrode column, and a battery; the first elastic electrode column and the second elastic electrode column are arranged in parallel to each other and are electrically connected to a positive electrode and a negative electrode of the battery, respectively;

the atomizer assembly is configured to be detachably connected to the battery assembly, and in the case that the atomizer assembly is connected to the battery assembly, the first elastic electrode column and the second elastic electrode column abut against the annular end surface of the outer electrode and the annular end surface of the inner electrode, respectively; the first elastic electrode column and the second elastic electrode column are both deviated from an opening of the hollow cavity; and the outer electrode and the first elastic electrode column together with the inner electrode and the second elastic electrode column are configured to form a closed loop, to allow the battery to provide power to the electric heating wire assembly.

2. The electronic cigarette according to claim 1, wherein,
the battery assembly further comprises a battery sleeve configured to wrap and protect elements inside the battery assembly;
the battery sleeve is provided with an end cap at an end where the battery assembly and the atomizer assembly are connected; and
the end cap is provided with through holes for insertion of the first elastic electrode column and the second elastic electrode column, and further provided with a smoke through hole configured to allow the smoke to pass through.

3. The electronic cigarette according to claim 2, wherein,
the battery assembly is further provided with a smoke channel configured to allow the smoke to pass through, and the smoke channel is isolated from the elements inside the battery assembly; and
the smoke channel is in communication with the smoke through hole.

4. The electronic cigarette according to claim 2, wherein,
each of the first elastic electrode column and the second elastic electrode column comprises a fixing sleeve, a spring, and a conductive terminal;
the fixing sleeve is fixed on the end cap;
the conductive terminal has one end movably inserted in the fixing sleeve, and another end extending out of the fixing sleeve and abutting against the annular end surface of the outer electrode or the inner electrode; and
the spring is provided inside the fixing sleeve and elastically abuts against the fixing sleeve and one end of the conductive terminal.

5. The electronic cigarette according to claim 2, wherein,
the battery assembly is further provided with a connecting part;
a first end of the connecting part is threadedly connected to the battery sleeve; and
a second end of the connecting part is provided with threads and is configured to threadedly connect the battery assembly to the atomizer assembly.

6. The electronic cigarette according to claim 1, wherein,
the annular end surface of the outer electrode and the annular end surface of the inner electrode are each provided with a groove; and
the grooves are configured to allow the first elastic electrode column and the second elastic electrode to be slidable along the annular end surfaces, respectively, and to allow the outer electrode to be in contact with and electrically connected to the first elastic electrode column and the inner electrode to be in contact with and electrically connected to the second elastic electrode column.

7. The electronic cigarette according to claim 1, wherein,
the electronic cigarette further comprises a liquid container for storing the cigarette liquid and a suction end for smoking the electronic cigarette;
the liquid container is configured to be detachably connected to the atomizer assembly, and one end of the atomizer assembly is configured to be inserted into the liquid container to lead out the cigarette liquid in the liquid container to be atomized; and
the suction end is arranged at an end of the electronic cigarette away from the liquid container.

8. The electronic cigarette according to claim 7, wherein,
the atomizer assembly further comprises an atomizing core for atomizing the cigarette liquid, and at least one end of the atomizing core is inserted in the liquid container;
the atomizing core comprises a sleeve, and a cigarette liquid locking part made of a liquid-absorbing material;
the cigarette liquid locking part is arranged inside the sleeve and fits closely to an inner circumferential surface of the sleeve, and is configured to deliver the cigarette liquid in the liquid container to the electric heating wire assembly to be atomized, and to prevent leakage of the cigarette liquid in the case that the liquid container is placed upside down; and
the sleeve is configured to wrap the cigarette liquid locking part for protection.

9. The electronic cigarette according to claim 8, wherein,
the electric heating wire assembly comprises a liquid-guiding part extending along an axial direction of the sleeve, and an electric heating wire winding around the liquid-guiding part and electrically connected to the outer electrode and the inner electrode; and
the cigarette liquid locking part and the liquid-guiding part are each of a solid cylindrical shape, and a sectional area of the cigarette liquid locking part is larger than a sectional area of the liquid-guiding part.

10. The electronic cigarette according to claim 7, wherein,
the electronic cigarette further comprises an elastic sealing sleeve sleeved on an outer circumferential surface of the sleeve; and
one end of the elastic sealing sleeve abuts against an opening of the liquid container, to prevent leakage of the cigarette liquid from the opening.

11. The electronic cigarette according to claim 7, wherein,
the liquid container and the battery assembly are located at two ends of the atomizer assembly, respectively, and the liquid container, the battery assembly and the atomizer assembly are arranged coaxially with each other; and
the suction end is arranged at one end of the battery assembly away from the atomizer assembly.

12. The electronic cigarette according to claim 11, wherein,
an end, facing the atomizer assembly, of the battery assembly is provided with a smoke through hole which is in communication with the suction end and is configured to allow the smoke to pass through, and the smoke through hole and the opening of the hollow cavity of the inner electrode are staggered with each other.

13. The electronic cigarette according to claim 1, wherein,
an insulating ring is provided between the outer electrode and the inner electrode, to insulate and separate the outer electrode from the inner electrode.

* * * * *